(12) United States Patent
Frahim et al.

(10) Patent No.: US 10,693,720 B2
(45) Date of Patent: Jun. 23, 2020

(54) DISTRIBUTION OF UPDATES IN AN IOT NETWORK

(71) Applicant: Cisco Technology, Inc., San Jose, CA (US)

(72) Inventors: Jazib Frahim, Cary, NC (US); Aun Raza, Dubai (AE); Erum Frahim, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 446 days.

(21) Appl. No.: 15/482,955

(22) Filed: Apr. 10, 2017

(65) Prior Publication Data

US 2018/0295016 A1 Oct. 11, 2018

(51) Int. Cl.
*H04L 12/24* (2006.01)
*H04L 29/08* (2006.01)

(52) U.S. Cl.
CPC ........ *H04L 41/082* (2013.01); *H04L 41/0893* (2013.01); *H04L 67/34* (2013.01); *H04L 41/12* (2013.01); *H04L 67/12* (2013.01)

(58) Field of Classification Search
CPC . H04L 5/00; H04L 5/003–0035; H04L 29/00; H04L 29/02–06006; H04L 29/08; H04L 29/08081; H04L 29/08135; H04L 29/08144; H04L 29/08261; H04L 29/08306; H04L 41/00; H04L 41/08–0806; H04L 41/0813; H04L 41/082; H04L 41/0893; H04L 41/12; H04L 51/00; H04L 51/18; H04L 67/00;
(Continued)

(56) References Cited

U.S. PATENT DOCUMENTS

| 5,956,400 A * | 9/1999 | Chaum | H04L 29/06 380/28 |
| 7,035,906 B1 * | 4/2006 | Ellis, III | H04L 63/0209 709/208 |

(Continued)

OTHER PUBLICATIONS

Perepeltsa et al., "How does BitTorrent work" Apr. 2015, Quora.*
(Continued)

*Primary Examiner* — Tauqir Hussain
*Assistant Examiner* — Boris D Grijalva Lobos
(74) *Attorney, Agent, or Firm* — Behmke Innovation Group LLC; James M. Behmke; Jonathon P. Western

(57) ABSTRACT

In one embodiment, a computing device groups a plurality of devices into update clusters based at least on their connectivity layout, and divides update data into a plurality of update portions, distributing the plurality of update portions to a plurality of selected redistribution devices in the particular cluster (each receiving one or more of the portions). The computing device notifies devices in the particular cluster (that can use the update data) of the plurality of selected redistribution devices along with which particular update portions are available from each of the plurality of selected redistribution devices. This therefore causes (or allows) the devices needing an update to i) download needed update portions of the plurality of update portions from the redistribution devices, ii) combine all of the plurality of update portions into the update data, and iii) perform an update using the combined update data.

18 Claims, 12 Drawing Sheets

(58) Field of Classification Search
CPC ........... H04L 67/06; H04L 67/10–1004; H04L 67/104–1046; H04L 67/1063; H04L 67/12; H04L 67/14; H04L 67/28; H04L 67/2814; H04L 67/2842; H04L 67/2838; H04L 67/2852; H04L 67/34
See application file for complete search history.

(56) References Cited

U.S. PATENT DOCUMENTS

| | | | | |
|---|---|---|---|---|
| 7,353,240 | B1* | 4/2008 | Takamoto | H04L 67/1097 |
| 7,421,688 | B1 | 9/2008 | Righi et al. | |
| 7,512,943 | B2* | 3/2009 | Hester | H04L 63/08 |
| | | | | 717/177 |
| 7,516,181 | B1* | 4/2009 | Du | H04L 67/1008 |
| | | | | 709/205 |
| 7,584,285 | B2* | 9/2009 | Hudson | D01D 5/423 |
| | | | | 709/228 |
| 7,756,051 | B2* | 7/2010 | Rodriguez | G06Q 20/401 |
| | | | | 348/394.1 |
| 8,024,723 | B2* | 9/2011 | Nahm | G06F 8/65 |
| | | | | 709/203 |
| 9,128,880 | B2 | 9/2015 | Benson et al. | |
| 9,158,526 | B1* | 10/2015 | Nguyen | H04L 41/08 |
| 2006/0130037 | A1* | 6/2006 | Mackay | G06F 8/658 |
| | | | | 717/168 |
| 2008/0071907 | A1* | 3/2008 | Thompson | H04L 67/104 |
| | | | | 709/224 |
| 2010/0030787 | A1* | 2/2010 | Conway | H04L 67/104 |
| | | | | 709/203 |
| 2014/0172968 | A1* | 6/2014 | Burba | H04L 67/1008 |
| | | | | 709/204 |
| 2016/0105305 | A1 | 4/2016 | Pignataro et al. | |
| 2016/0337169 | A1 | 11/2016 | Chhabra et al. | |
| 2017/0147227 | A1* | 5/2017 | Stabrawa | G06F 3/0608 |

OTHER PUBLICATIONS

Sharma et al., "I tried to install a software from a torrent on my laptop and instead it installed all other sorts of stuff like it changed my homepage. How do I uninstall everything?" Jun. 2015, Quora.*

Khandelwal, Swati, "World's largest 1 Tbps DDoS Attack launched from 152,000 hacked Smart Devices", http://thehackernews.com/2016/09/ddos-attack-iot.html, 2 pages, Sep. 27, 2016, The Hacker News.

Krebs, Brian, "Who Makes the IoT Things Under Attack?", https://krebsonsecurity.com/2016/10/who-makes-the-iot-things-under-attack/, 2 pages, Oct. 3, 2016, Krebs on Security.

Taherkordi, et al., "Optimizing Sensor Network Reprogramming via In-situ Reconfigurable Components", ACM Transactions on Sensor Networks, 2013, 9 (2), pp. 1-37, Association for Computing Machinery.

* cited by examiner

| CLUSTER 605 | DEVICE 610 | CHUNKS 615 |
|---|---|---|
| 1 | S1, S6 | 1, 6, 7, 12 |
| 1 | S2, S5 | 2, 5, 8, 11 |
| 1 | S3, S4 | 3, 4, 9, 10 |

TABLE 600

FIG. 6

TABLE 700A

| CLUSTER 605 | DEVICE 610 | CHUNKS 615 |
|---|---|---|
| 1 | S1 | 1, 6, 7, 12 |
| 1 | S2 | 2, 5, 8, 11 |
| 1 | S3 | 3, 4, 9, 10 |
| 1 | S4 | 3, 4, 9, 10 |
| 1 | S5 | 2, 5, 8, 11 |
| 1 | S6* | 1, 6, 7, 12 |

FIG. 7A

TABLE 700B

| CLUSTER 605 | DEVICE 610 | CHUNKS 615 |
|---|---|---|
| 1 | S1 | 1, 2, 5, 6, 7, 10, 12 |
| 1 | S2 | 1, 2, 5, 7, 8, 9, 11 |
| 1 | S3 | 3, 4, 9, 10 |
| 1 | S4 | 1, 2, 3, 4, 5, 6, 7, 8, 9, 10, 11, 12 |
| 1 | S5 | 1, 2, 3, 5, 8, 10, 11 |
| 1 | S6* | 1, 6, 7, 12 |

FIG. 7B

DISTRIBUTION OF UPDATES IN AN IOT NETWORK

TECHNICAL FIELD

The present disclosure relates generally to computer networks, and, more particularly, to distribution of updates in an Internet of Things (IoT) network.

BACKGROUND

The Internet is known to experience Distributed Denial of Service (DDoS) attacks, which recently have exceeded 1 terabit per second (tbps) of traffic generated by over 150,000 "Internet of Things" (IoT) or Smart devices. Many consumers do not even know that their smart devices (such as Internet-connected televisions, cars, refrigerators, or thermostats) are participating in these massive attacks by acting as "bots". Unfortunately, it is becoming far too easy for hackers/miscreants to gain control of poorly configured and potentially vulnerable IoT/smart devices.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example update table;
FIGS. 7A-7B illustrate an alternative example of an update table.

DESCRIPTION OF EXAMPLE EMBODIMENTS

Overview

Figure 1:
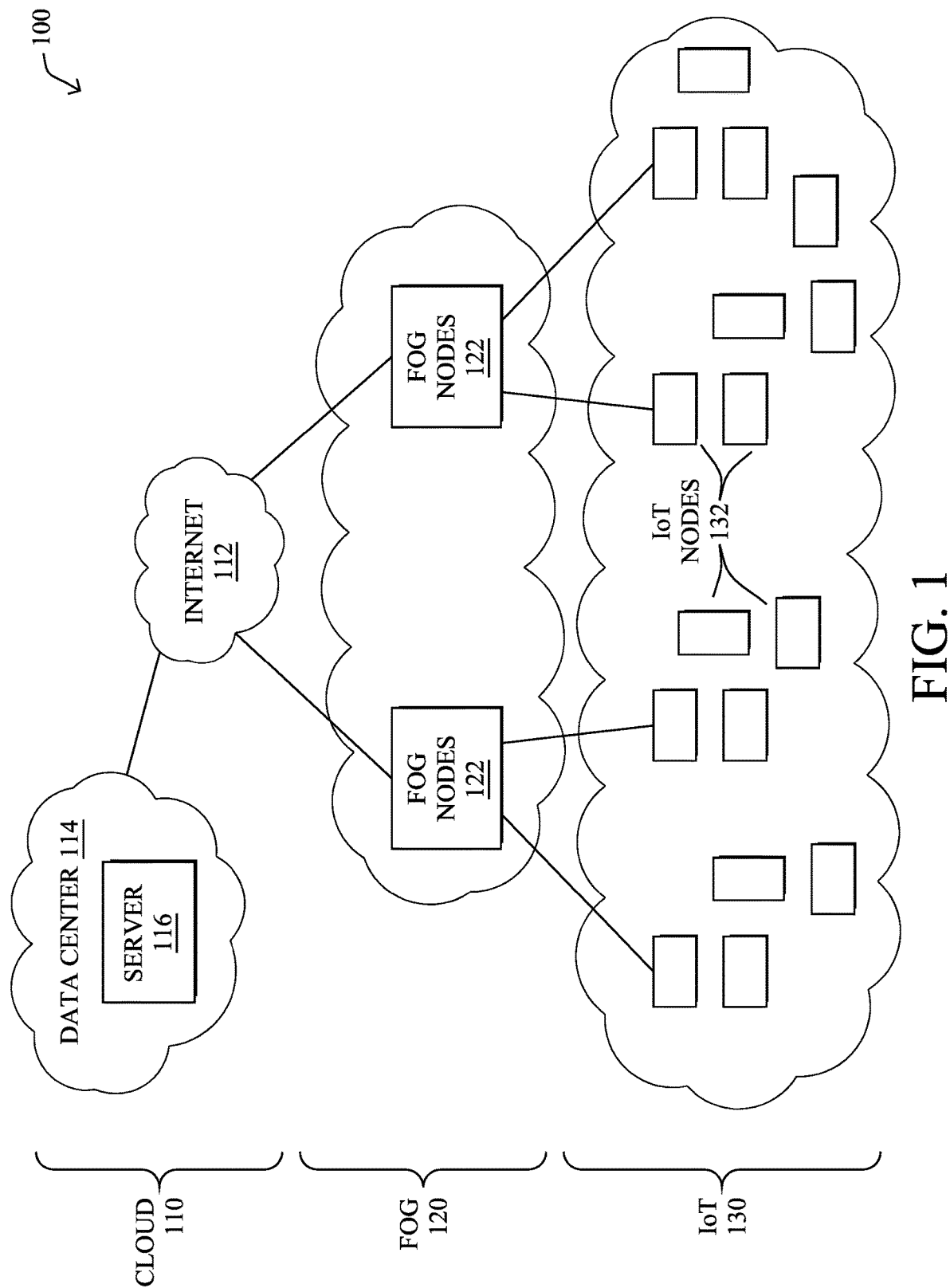
FIG. 1 illustrates an example computer network.

According to one or more embodiments of the disclosure, a computing device (e.g., a controller) determines a connectivity layout of a plurality of devices across an area, and groups the plurality of devices into one or more update clusters based at least on the connectivity layout. The computing device may then divide update data into a plurality of update portions for a particular cluster of the one or more update clusters, and distributes the plurality of update portions to a plurality of selected redistribution devices in the particular cluster, each redistribution device receiving one or more of the plurality of update portions. Accordingly, the computing device notifies one or more of the plurality of devices in the particular cluster, for which the update data is applicable, of the plurality of selected redistribution devices along with which particular update portions are available from each of the plurality of selected redistribution devices. This therefore causes the one or more of the plurality of devices for which the update data is applicable to i) download needed update portions of the plurality of update portions from the redistribution devices, ii) combine all of the plurality of update portions into the update data, and iii) perform an update using the combined update data.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
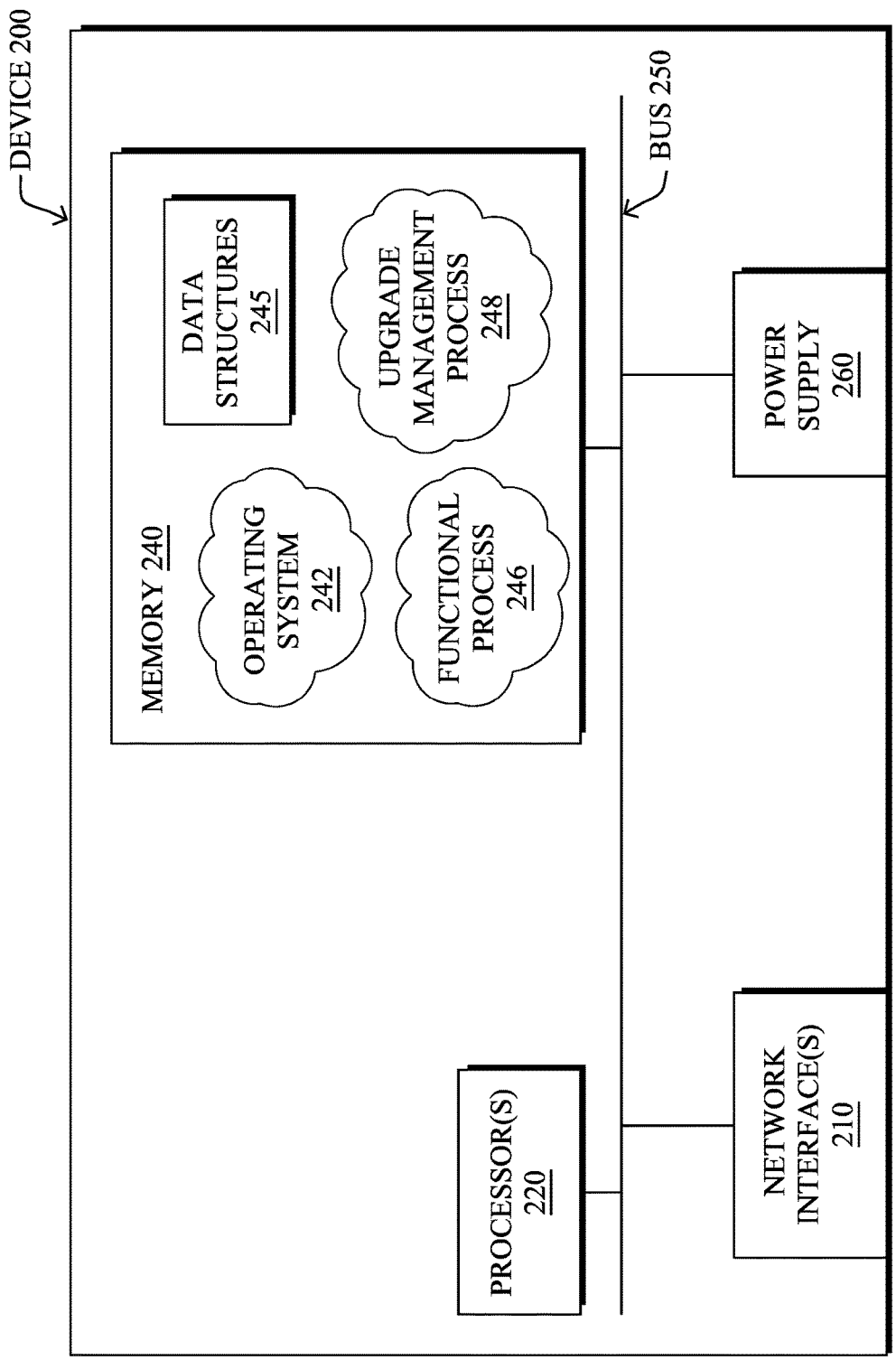
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, cellular transceivers, WiFi transceivers, or the like, to allow device 200 to communicate information to and from a remote computing device or server. Note, further, that the nodes may have two different types of network connections 210, e.g., wireless and wired/physical connections, and that the view herein is merely for illustration. Also, while the network interface 210 is shown separately from power supply 260, for devices using powerline communication (PLC), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "update management" process 248, as described herein. Notably, functional processes 246, when executed by processor(s) 220, cause each particular device 200 to perform the various functions corresponding to the particular device's purpose and general configuration. For example, a sensor would be configured to operate as a sensor, an access point would be configured to operate as an access point, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Distribution of Updates in an IoT Network—

As noted above, the Internet is known to experience Distributed Denial of Service (DDoS) attacks, often sourced by IoT devices acting as bots. Though periodic software or "firmware" updates are often available to fix previously unknown security vulnerabilities, many IoT devices are not too well connected (e.g., battery operated, intermittent operation, weak communication connections, etc.). That is, although some smart devices (like smart-watches, smart bulbs, etc.) can connect to the Internet via controllers for firmware/image updates, there are multiple scenarios where IoT devices (e.g., sensors) have intermittent and/or partial connectivity to a software repository (residing on a controller, or accessing through a controller). In such cases, image/firmware updates are challenging when an IoT device field (e.g., sensor field) is comprised of tens of thousands of devices/sensors.

The techniques herein, therefore, provide a scalable system where heterogeneous IoT devices (e.g., sensors and actuators) can participate in the distribution of images/patches/files without going through self-updates. In particular, the techniques herein propose a mechanism to distribute "chunks" of an update (or upgrade) to a set of IoT devices to then be reassembled via direct device-to-device interaction. As described below, this will ensure that clusters of sensors can be created to distribute the images even if devices are of different types. Also, as described herein, in case of image integrity failure, the device may only need to re-download the corrupted chunks (bad signal/transmission, etc.), especially if they are located far from the controller (e.g., IoT devices in the middle of the ocean). The techniques herein will thus save time and bring efficiency to current techniques of updating such devices.

Specifically, according to one or more embodiments of the disclosure as described in detail below, a computing device (e.g., controller) groups a plurality of devices (e.g., IoT devices) into update clusters based at least on their connectivity layout, and divides update data into a plurality of update portions (the "chunks"), distributing the plurality of update portions to a plurality of selected redistribution devices in the particular cluster (each receiving one or more of the portions). The computing device notifies devices in the particular cluster (that can use the update data) of the plurality of selected redistribution devices along with which particular update portions are available from each of the plurality of selected redistribution devices. This therefore causes (or allows) the devices needing an update to i) download needed update portions of the plurality of update portions from the redistribution devices, ii) combine all of the plurality of update portions into the update data, and iii) perform an update using the combined update data.

Illustratively, the techniques described herein may be performed by hardware, software, and/or firmware, such as in accordance with the illustrative "update management" process 248, which may include computer executable instructions executed by the processor 220 to perform functions relating to the techniques described herein, e.g., on one or more suitable devices, depending on the corresponding functionality of the device(s).

Operationally, the techniques herein propose a method to dynamically distribute a firmware/image to a large number of devices (e.g., IoT devices/sensors, etc.) that partake to support a function (e.g., determine air moisture, detect seismic activity, read external/internal temperatures, and so on). Illustratively, the embodiments herein are described with reference to a sensor-controller enabled IoT network, however, other types of networks may equally benefit from the techniques herein.

Figure 3:
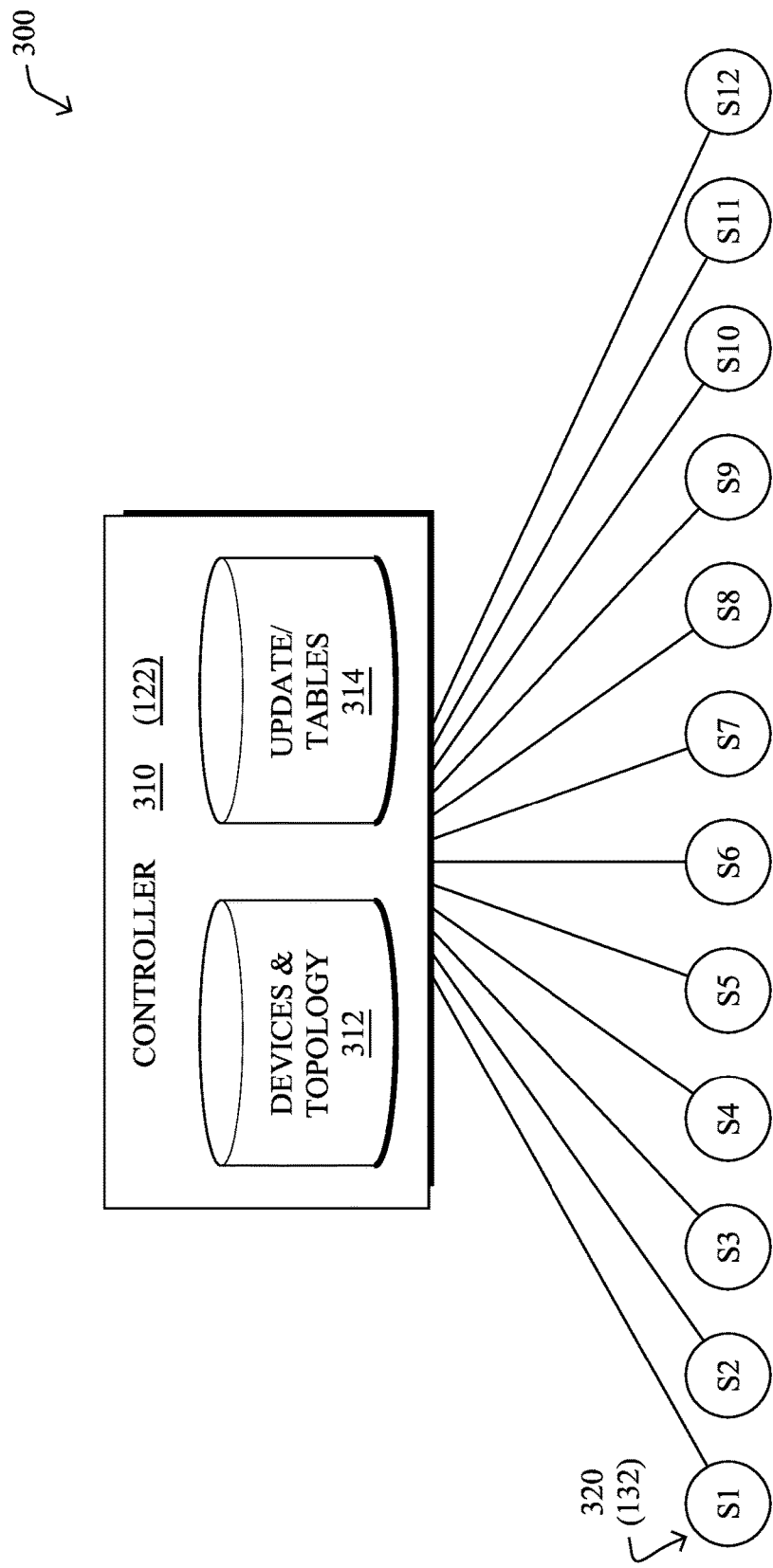
FIG. 3 illustrates an example of a simplified "update network"

In such an illustrative IoT network, such as that shown in FIG. 3, devices 320 (e.g., IoT nodes 132) in a given area 300 (e.g., field, factory, etc.) generally are configured in a mesh configuration (each being able to communicate with each other), and each may also communicate directly with a controller 310 (e.g., Fog node 122) or other central node/device. For example, the sensors (or actuators) may be deployed in huge numbers spread across an area, and have connectivity through a communications interface to send the relevant data. This communications interface could be one or more of a WiFi, BlueTooth, 3/4G, Ethernet, or other connections, which may allow communication between some or all of the other devices (including controller 310), depending on the capability of the medium being used.

As described herein, based on the devices and their topology (e.g., connectivity, characteristics, capabilities, etc.), illustratively stored in database 312, the controller may determine the optimal way to distribute "chunks" of data relating to an update. For instance, an illustrative IoT Fog Controller/Node 310 may be configured with a database 312 of all registered IoT devices in the area and a graph or similar database that has details about the location of devices and their proximity to each other and information of all the available disk space across all the sensors. The controller 310 may also have a repository 314 of updates (images/software/patches), and tables of which devices have which updates (or update segments/portions), as described below. (Note that the actual location of these databases, including their format, separation, combinations, etc., are merely illustrative, and not meant to limit the scope of the embodiments herein.)

According to the embodiments herein, communication and/or data flows between the controller and peer-devices are defined to distribute updates to potentially "weaker" IoT devices in a scalable manner. First, IoT devices/sensors 320 are registered with the Fog controller 310 using their pre-configured identity attributes (e.g., UID, PKI, etc.), such as, illustratively, "S1-S12". As a part of their registration, the Fog controller catalogs their capabilities, current software, hardware, and/or firmware attributes, as well as information about proximity to other devices 320 and their uniquely identifiable information. The controller illustratively maintains this in a database 312, as mentioned above.

Based on the information collected, the Fog controller 310 can leverage functions such as Graph Database, Dijkstra algorithm, or others as will be appreciated by those skilled in the art to determine the devices' layout across the field 300, and may determine their grouping into "clusters" in the most optimal fashion. This grouping illustratively allows for optimal communication for distribution of software/information. Note that the devices 320 do not have to have identical software or hardware features, attributes, images, etc. to be a part of a cluster. As long as they have the capabilities to partake in software distribution leveraging a protocol as described herein, the devices can download specific chunks from a controller and then distribute them to other peer members of the cluster. That is, a chunk distribution device or "redistribution device" herein, may not even need the update/information being disseminated. Note further that devices available for redistribution may optionally be dictated by a security policy to permit/deny certain devices 320 from taking part in the software distribution process (that is, securely limiting which devices across an area 300 can be selected as redistribution devices.)

Figure 4A:
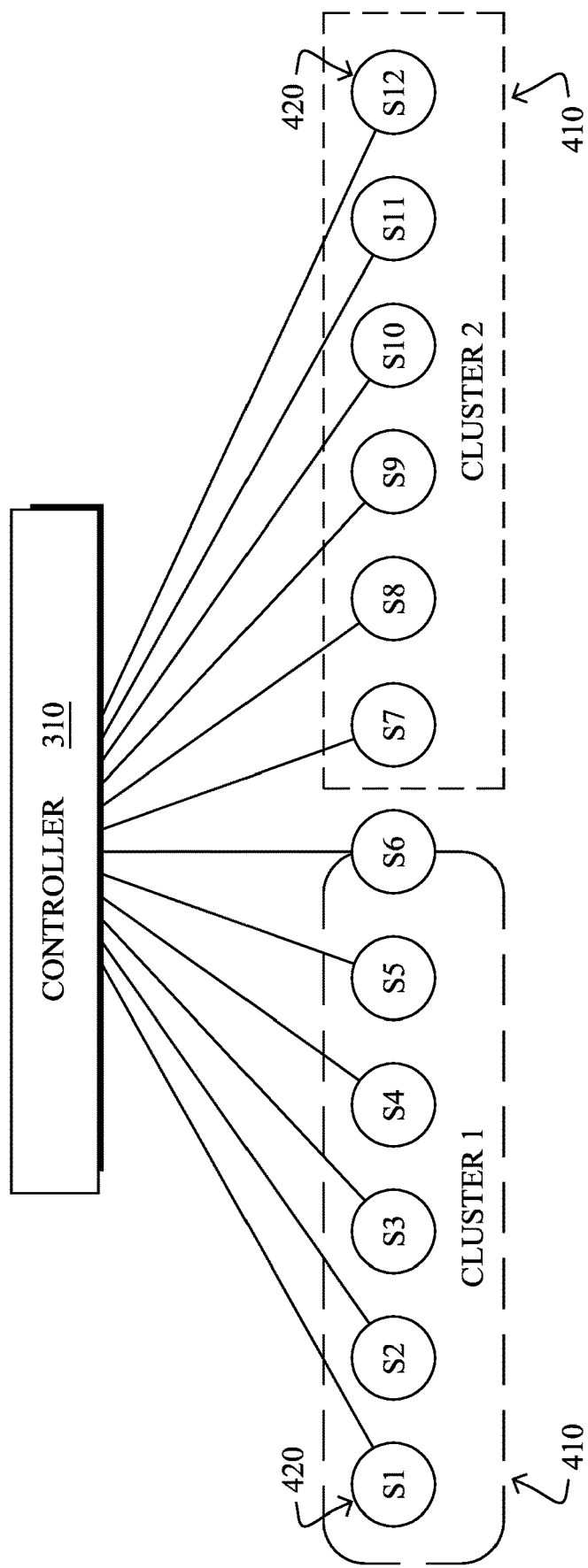
FIGS. 4A-4C illustrate examples of update clusters.
Figure 4B:
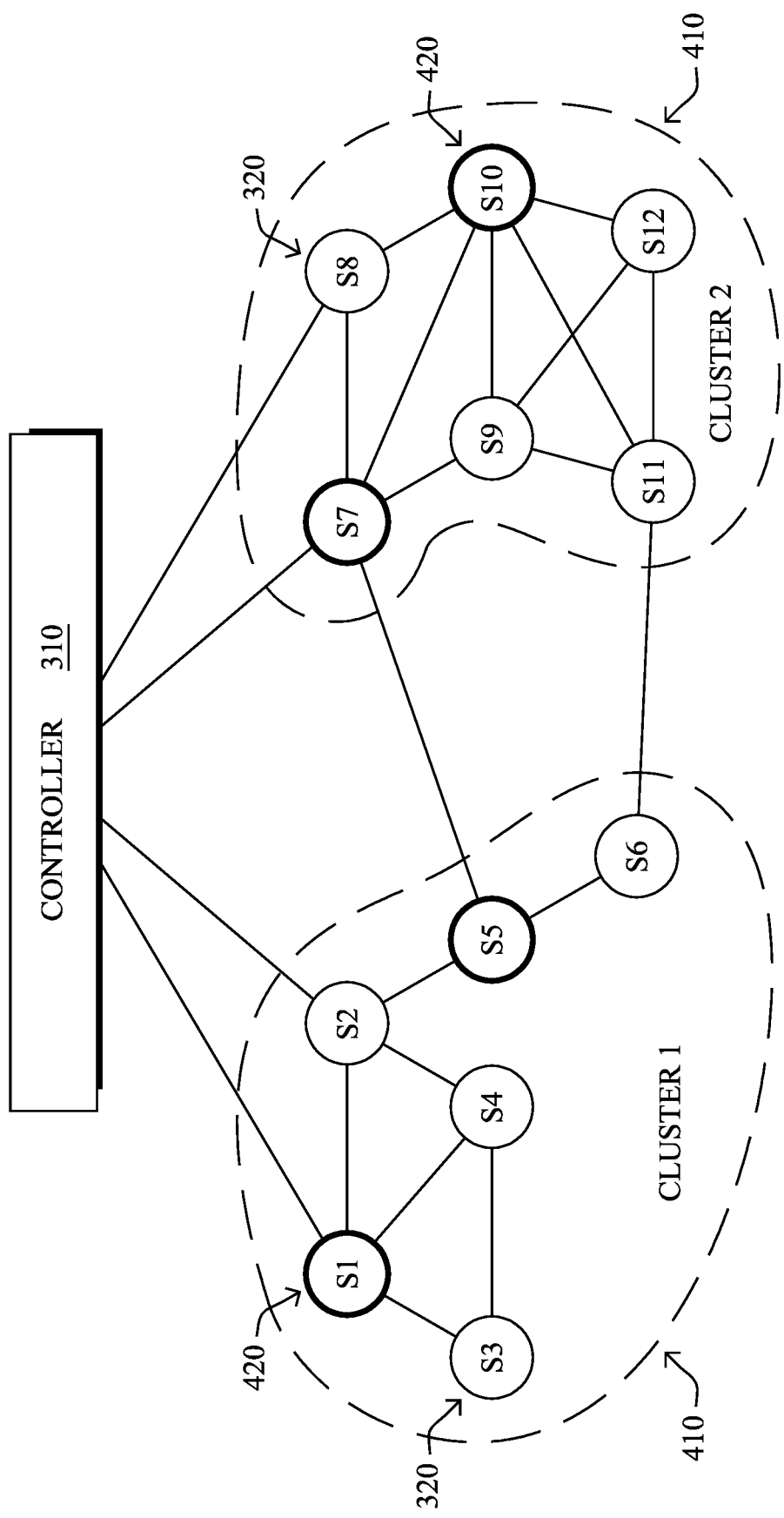
Figure 4C:
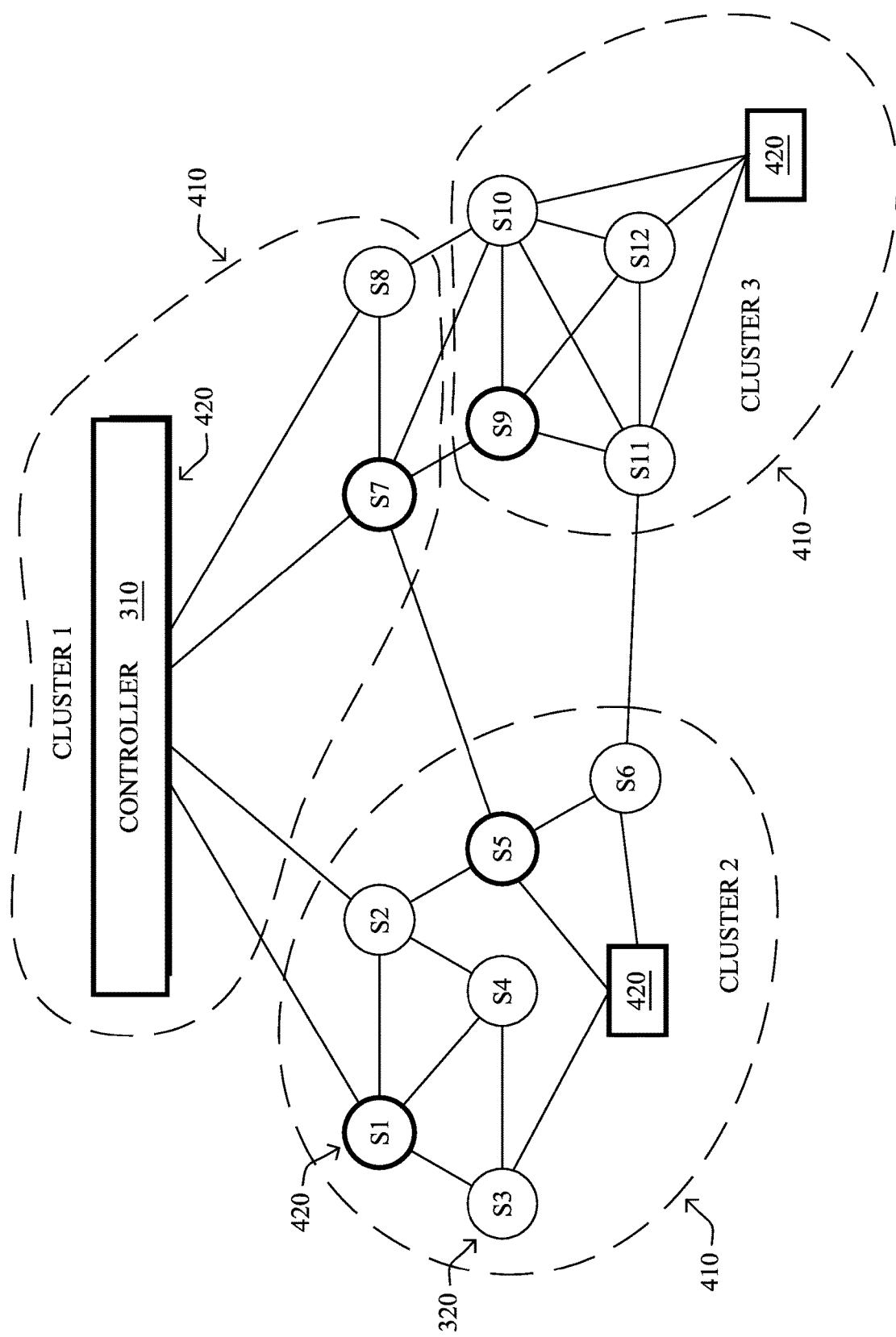

FIG. 4A illustrates an example simplified clustering of devices 320 of area 300 into two clusters 410, "Cluster 1" and "Cluster 2". Illustratively, and in accordance with one particular embodiment, each of the devices 320 may be selected as redistribution devices 420 (shown with thicker outline), and each device is also interconnected with the controller 310, and as mentioned above, meshed to each other as well, sharing the update portions/chunks with each other. However, the techniques herein are not so limited, and as shown in FIGS. 4B-4C, other topologies and/or distribution determinations may be made, accordingly. For instance, as shown in FIG. 4B, certain IoT networks or other networks may be connected in a "tree-like" topology, where certain devices communicate with other certain devices (e.g., a directed acyclic graph, or DAG). As such, certain devices may be selected as redistribution devices 420 based on connectivity, capability, etc., while other devices 320 will be instructed to obtain the update chunks from the other device 420, accordingly. Further, areas 300 may be in proximity to other "high-powered" or "well-connected" devices. As such, FIG. 4C illustrates the instance where redistribution devices 420 may include such other devices and/or controllers 310 as well (e.g., Ethernet connected devices, such as access points, collectors, or other Fog or IoT nodes).

Essentially, the techniques herein may be configured to distribute chunks to all of the devices 320 to act as redistribution devices 420, or may designate certain devices that remain the source of the chunks, as described below. (Note also that as described further below, as each particular device 320 receives a new chunk, that chunk may then be available to other surrounding devices from that particular device as a redistribution device for that chunk.)

Illustratively, the Fog controller 310 determines, based on capability (bandwidth, resource usage, available memory, storage space, etc.), redundancy, connection, location, and other factors, how the chunks of data should be distributed among the redistribution devices 420 in each cluster 410. For example, some nodes may get bigger chunks, while other nodes receive smaller ones. Also, some nodes might get more chunks while others get less. For redundancy (load balancing, back-ups, etc.), each chunk may be distributed to multiple redistribution devices 420 within the clusters.

Figure 5:
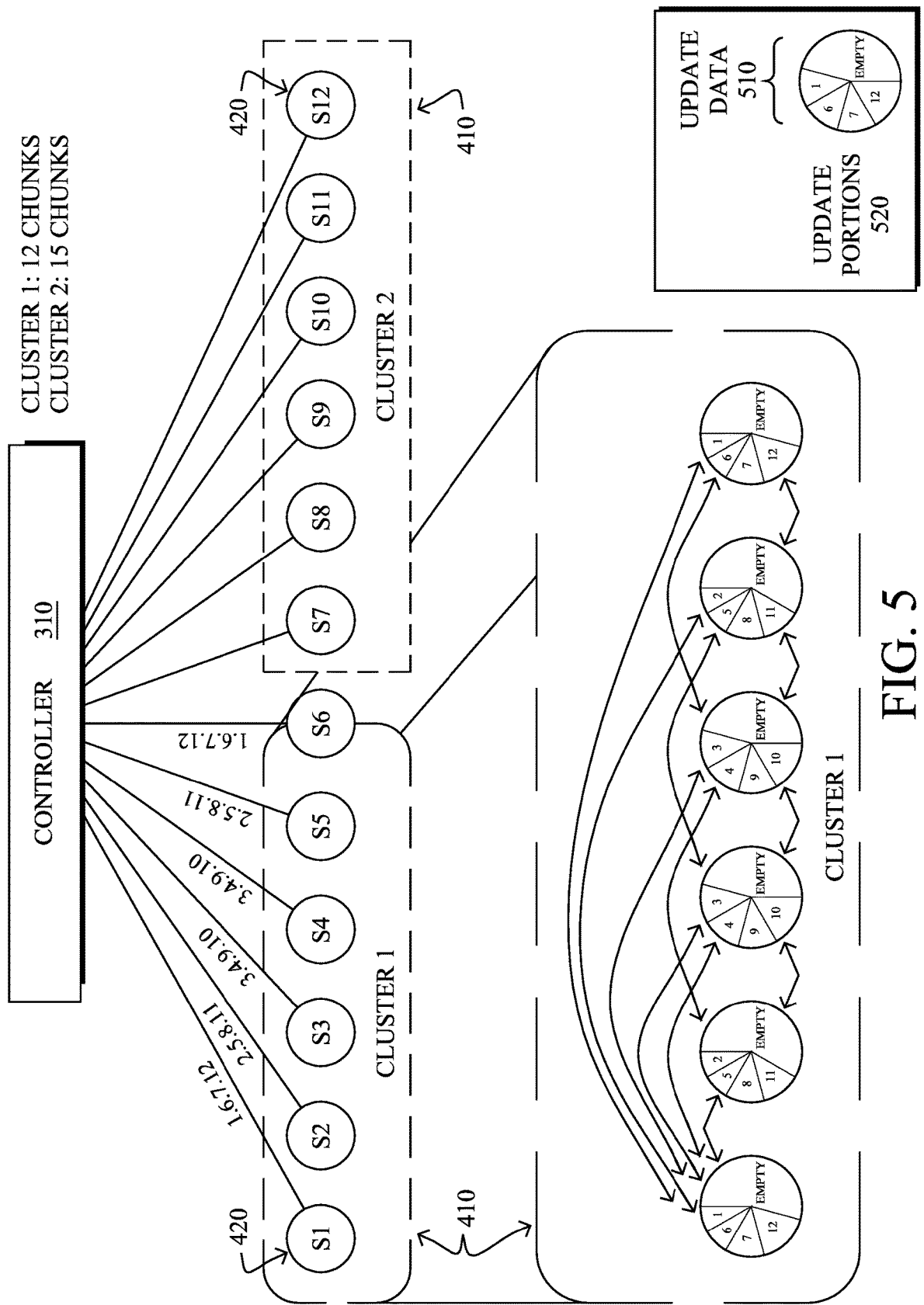
FIG. 5 illustrates an example of redistribution devices for update clusters.

FIG. 5 illustrates an example of the update portions (chunks) of the update data 510 for Cluster 1 of FIG. 4A above, in particular, showing twelve update portions 520. (Note that Cluster 2 may have a different number of portions (e.g., fifteen), for the same update data 510, perhaps due to different device capabilities.) The controller may thus determine how to divide the twelve update portions 520 amongst the devices, such as four portions for each device, and the same portions sent to two devices each for redundancy as mentioned above. The controller may thus create and maintain an index of the distribution of file chunks, as shown in table 600 of FIG. 6. That is, for each cluster 605, a set of devices 610 and their corresponding update portions or chunks 615 may be maintained by the table 600. Note that an alternative format of the table, namely table 700A of FIG. 7A, may be separated into individual devices, or any other suitable format, and the specific configuration of the data structures shown herein are not meant to be limiting to the present disclosure.

Once the cluster groupings are made, the selection of redistribution devices is determined, and the update data 510 has been divided into update portions 520 and assigned to the redistribution devices, as shown again with reference to FIG. 5, the Fog controller 310 initiates the transmission of the chunks to the respective nodes. When a redistribution device 420 has downloaded its chunk(s), it sends a notification of completion to the controller. As the Fog controller receives notification from devices in a cluster, it notifies the appropriate members of the cluster about the availability of a chunk and the primary/secondary peers offering that specific chunk. Note again that some cluster members are only participating in the distributions of a file (image/patch). That is, in some cases, they will not need to go through an image update process themselves.

The cluster members in need of particular update portions (missing chunks), can initiate the download of the needed portions by connecting to each other based on knowing where to find the particular portions. Illustratively, as mentioned above, the devices may be configured as a full-mesh within the cluster, and each may obtain the portions from the other devices. Notably, in one embodiment, the devices 320 may only download particular portions from selected/assigned redistribution devices 420 (e.g., portions 1, 6, 7, and 12 from devices S1 and S6 only). In another embodiment, as each device 320 downloads a particular portion, those portions then become downloadable from that device. For instance, and with reference to the table 700B of FIG. 7B, as each device downloads the portions (chunks 615), the table may be updated and shared with the devices so they can determine where best to locate their missing and needed portions 510. As an example, through such a feedback loop system, assuming device S1 has downloaded portions 1, 2, 5, 6, 7, 10, and 12 (thus still needing 3, 4, 8, 9, and 11), other devices in the cluster can now download portions 2, 5, and 10 from device S1.

Note that as a further example, S6* may be configured solely as a redistribution device 420, and need not obtain further portions. (Diagnostics may also be available, such as noticing that S3 has not been able to obtain any of the needed update portions, and taking corrective action, accordingly.)

Once the devices 320 complete their downloads, they may verify the portions 520, and then combine the data into the original update data 510. The data 520 may then be verified for integrity, such as by calculating its checksum and comparing it with a checksum provided by the controller. At this point, the devices are ready to update, and can do so either instantly, in a staggered fashion, or on a schedule, e.g., based on (configurable) instructions from the controller 310. After the software update is complete, the devices 320 may then send a status notification to the Fog controller 310 indicating the completion of the update.

Accordingly, the embodiments described herein provide a scalable system for the distribution of updates or other information, by dividing the data into smaller portions, distributing the portions to redistribution devices, and then, through various possible configurations, allowing the devices to gather the needed portions for reassembly (re-combining the data), accordingly.

Figure 8:
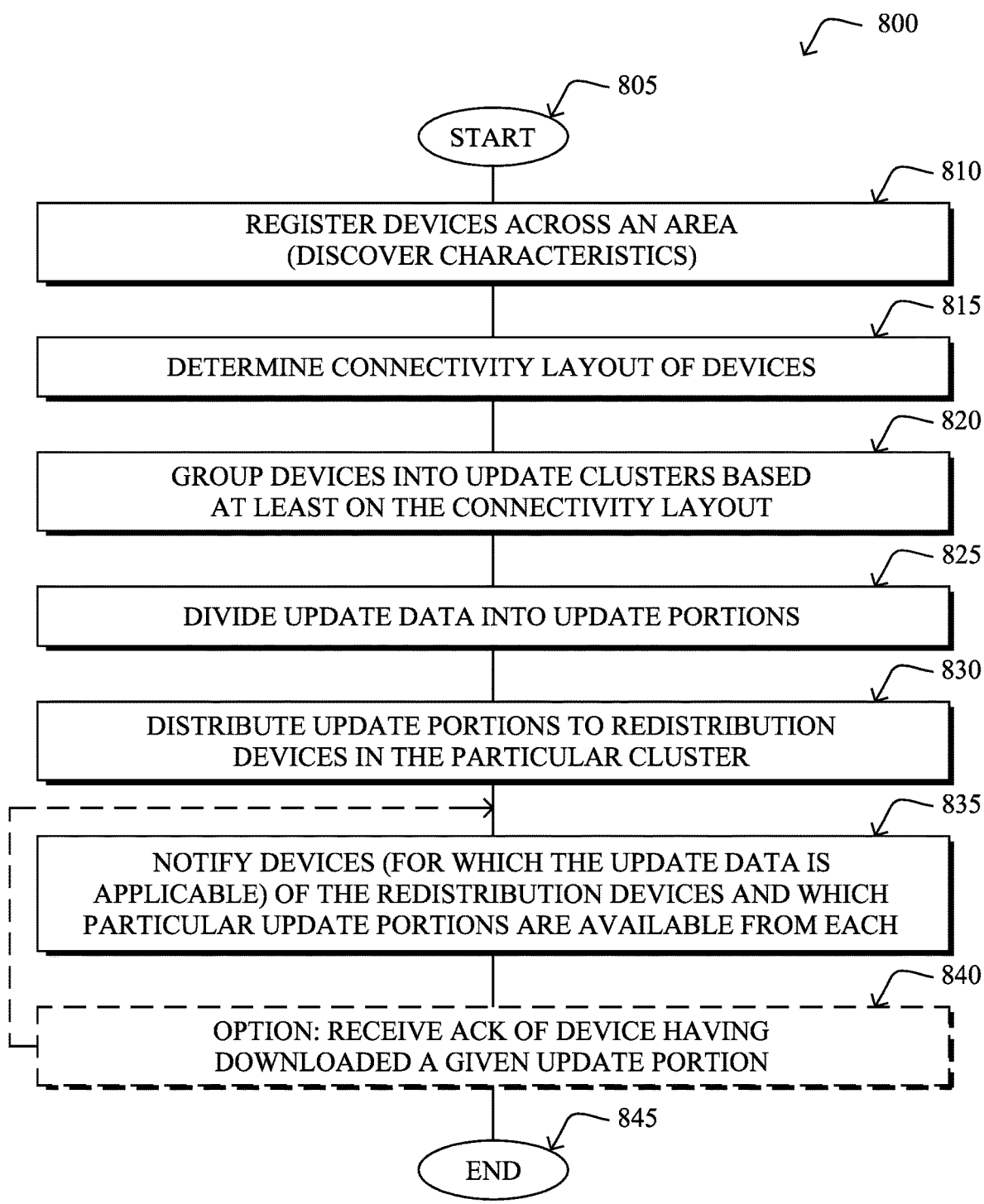
FIG. 8 illustrates an example simplified procedure for distribution of updates in an Internet of Things (IoT) network, particularly from the perspective of a controller.

FIG. 8 illustrates an example simplified procedure for distribution of updates in an IoT network in accordance with one or more embodiments described herein, particularly from the perspective of a controller. For example, a non-generic, specifically configured device (e.g., device 200), such as a controller 310, may perform procedure 800 by executing stored instructions (e.g., process 248). The procedure 800 may start at step 805, and continues to step 810, where, as described in greater detail above, the controller 310 registers a plurality of devices 320 across an area (e.g., discovering characteristics such as device capabilities, device software, hardware, and/or firmware, location relative to other devices, connection to other devices, physical location, etc.). In step 815, the controller may then determine a connectivity layout of the plurality of devices across the area, and as described above, may then group the plurality of devices into one or more update clusters 410 based at least on the connectivity layout in step 820.

According to the techniques herein, in step 825 the controller may divide update data 510 into a plurality of update portions 520 for a particular cluster of the one or more update clusters. As described above, the controller may determine how to divide the update data based on one more characteristics of the plurality of devices, such as, for example, bandwidth, resource usage, available memory, available storage space, and so on, or else in one embodiment may simply receive pre-divided portions (e.g., from cloud computing resources). Note further that as mentioned above, the plurality of update portions for a particular cluster may comprise different-sized portions.

In step 830, the controller 310 distributes the plurality of update portions to a plurality of selected redistribution devices 420 in the particular cluster, where each redistribution device receives one or more of the plurality of update portions (notably, not necessarily the same number of portions, that is, resulting in certain redistribution devices receiving a different number of update portions than others). As described herein, the controller may redundantly distribute the plurality of update portions, such that each of the plurality of update portions may be distributed to two or more selected redistribution devices in the particular cluster, in order to allow for load-balancing, more efficient distribution, back-ups in case of failures, and so on. As also described herein, the redistribution devices may also be in need of the update data, though certain redistribution devices may not be devices for which the update data is applicable.

The controller in step 835 notifies one or more of the plurality of devices in the particular cluster, for which the update data is applicable, of the plurality of selected redistribution devices along with which particular update portions are available from each of the plurality of selected redistribution devices. For instance, the information from table 600 or 700 may be sent to the devices in the cluster that are in need of updating. As described above (and as illustrated further in FIG. 9, below), this causes the one or more of the plurality of devices for which the update data is applicable to i) download needed update portions of the plurality of update portions from the redistribution devices, ii) combine all of the plurality of update portions into the update data, and iii) perform an update using the combined update data.

Note that in an optional embodiment herein, in step 840, in response to receiving, from a particular device in the cluster, an acknowledgment of the particular device having downloaded a given update portion, the controller may return to step 835 to notify one or more of the plurality of devices in the particular cluster that the particular device is a redistribution device for the given update portion.

The procedure 800 may illustratively end in step 845, such as in response to the update process being completed, as described above.

Figure 9:
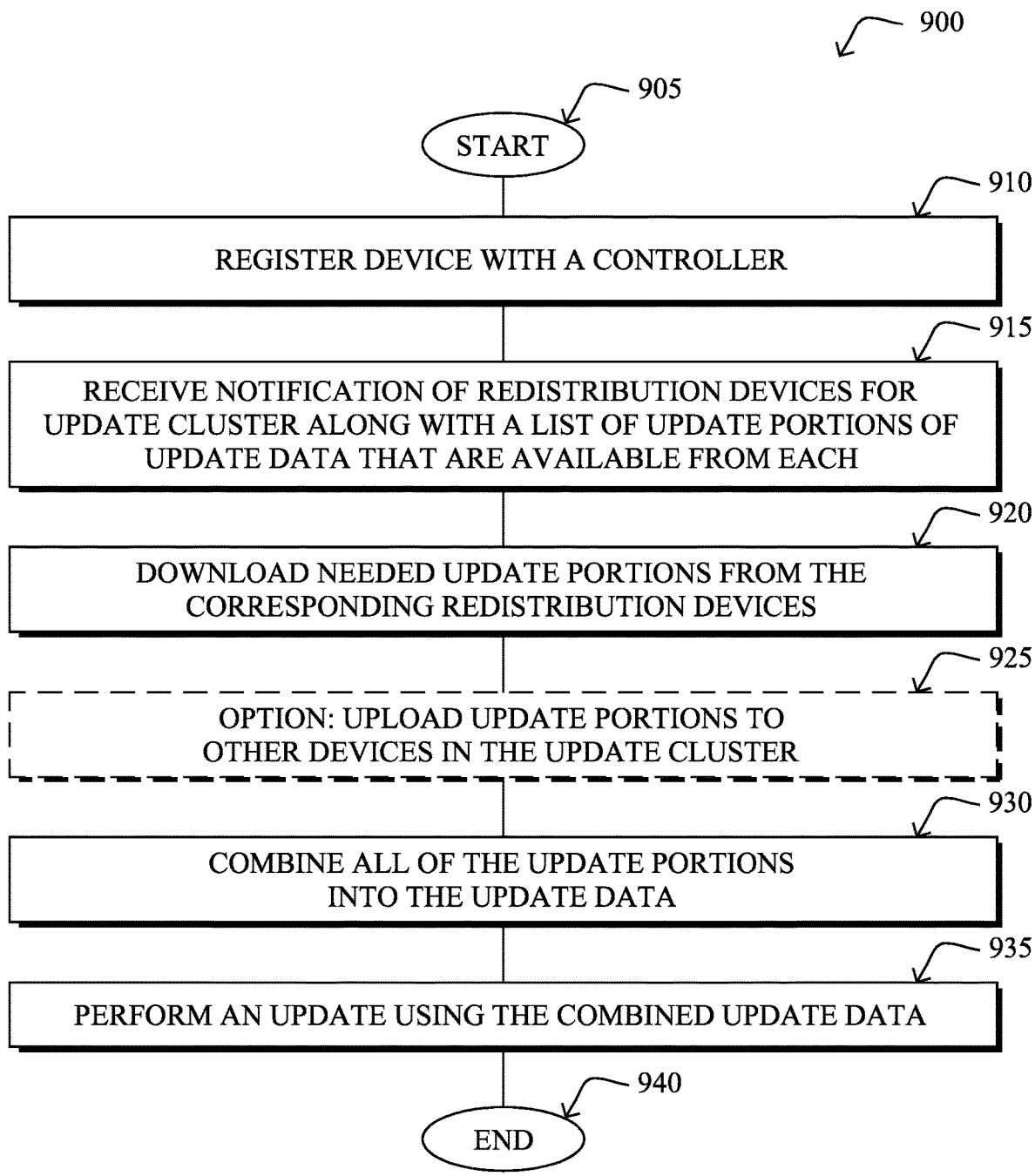
FIG. 9 illustrates another example simplified procedure for distribution of updates in an IoT network, particularly from the perspective of a device that needs updating.

FIG. 9 illustrates another example simplified procedure for distribution of updates in an IoT network in accordance with one or more embodiments described herein, particularly from the perspective of a device that needs to be updated. For example, a non-generic, specifically configured device (e.g., device 200), such as an IoT device (or other device that needs updating) 320, may perform procedure 900 by executing stored instructions (e.g., process 248). The procedure 900 may start at step 905, and continues to step 910, where, as described in greater detail above, the device registers with a controller for the area in which the device is being controlled (thus sharing the device characteristics, mentioned above). In step 915 the device may then receive a notification of a plurality of selected redistribution devices for the device's particular update cluster, along with a list of a plurality of update portions of update data that are available from each of the plurality of selected redistribution devices, as described above. As such in step 920, the device may download needed update portions (of the plurality of update portions) from the corresponding selected redistribution devices. Note that where update portions are redundantly distributed, then the device may first select a particular redistribution device for each needed update portion from which to download that needed update portion.

In one optional embodiment, in step 925 an updating device may also act as a redistribution device, and as such, the procedure would further comprise uploading one or more of the update portions to one or more other devices in the device's update cluster (e.g., after informing the controller that the update portions were available from this device, as noted herein).

In step 930 the updating device combines all of the plurality of update portions into the update data, and performs an update using the combined update data in step 935. As mentioned above, the update may be performed as soon as possible, at a prescribed time, or in response to receiving a specific instruction from a controller (after combining all of the plurality of update portions into the update data). The illustrative procedure 900 may then end in step 940.

Figure 10:
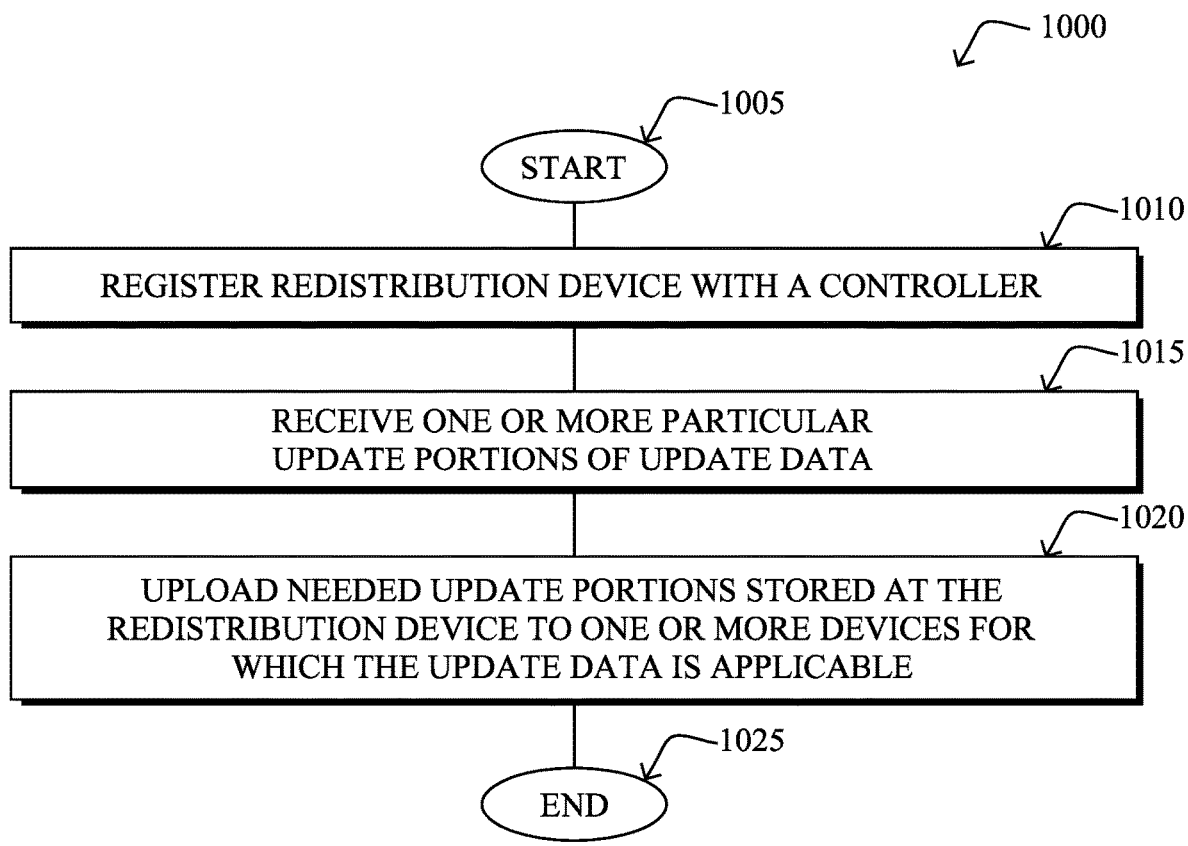
FIG. 10 illustrates still another example simplified procedure for distribution of updates in an IoT network, particularly from the perspective of an update redistribution device.

Lastly, FIG. 10 illustrates still another example simplified procedure for distribution of updates in an IoT network in accordance with one or more embodiments described herein, particularly from the perspective of an update redistribution device. For example, a non-generic, specifically configured device (e.g., device 200), such as a redistribution device 420, may perform procedure 1000 by executing stored instructions (e.g., process 248). The procedure 1000 may start at step 1005, and continues to step 1010, where, as described in greater detail above, the redistribution device also registers with a controller 310 and shares its information and characteristics. Here, notably, the redistribution device may need to prove that it meets not only the resource requirements (e.g., memory, processing, bandwidth, etc.), but also that it meets one or more security requirements for being selected as a redistribution device for the particular update cluster, such as tokens, keys, passwords, administrator approval, and so on.

In step 1015 the redistribution device receives one or more particular update portions 520 of update data 510, such as based on characteristics of the particular redistribution device (e.g., bandwidth, resource usage, available memory, available storage space, etc.). As described above (and particularly illustrated in FIG. 8), devices in the cluster in need of the update data (i.e., devices for which the update data is applicable) are notified of a plurality of selected redistribution devices along with which particular update portions are available from each of the plurality of selected redistribution devices. Accordingly, in step 1020, the redistribution device uploads any needed update portions that it has to devices in need of updating within the update cluster. (Recall that in some embodiments, the redistribution device is also a device in need of an update, though at other times, it is not a device for which the update data is applicable.)

Once the uploading is complete for the update data, the illustrative procedure 1000 may then end in step 1025.

It should be noted that while certain steps within procedures 800, 900, and 1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

The techniques described herein, therefore, provide for effective distribution of updates in an IoT network. In particular, when IoT devices (sensors, actuators, etc.) are distributed within a field, namely devices that in some cases do not have good bandwidth and/or lack direct communication with a controller, the techniques herein reliably provide an image (software, patch, or any other file) to potentially thousands of sensors by creating chunks and distributing them to the appropriate device(s), as detailed above. As noted, bandwidth between a controller and a potentially large number of IoT nodes might be costly, and there is a benefit to downloading update "chunks" into the mesh, where the IoT nodes can determine how to obtain the complete update set, often over a less costly network medium (e.g., 802.15.4 instead of 3G). The techniques herein thus provide vendors and even the IoT device consumers a well-defined mechanism to update (automatically and/or manually) the devices in a secure and scalable manner.

While there have been shown and described illustrative embodiments that provide for distribution of updates in an IoT network, it is to be understood that various other adaptations and modifications may be made within the spirit and scope of the embodiments herein. For example, while certain embodiments are described herein with respect to "IoT" networks in particular, the techniques are not limited as such and may be used with computer networks, generally, in other embodiments (e.g., mesh networks). In addition, while certain Edge/Fog devices are shown, such as access points, gateways, etc., other suitable devices may be used, accordingly. That is, the embodiments have been shown and described herein with relation to specific network configurations (orientations, topologies, protocols, terminology, etc.), and particularly to "fog" computing. However, the embodiments in their broader sense are not as limited, and may, in fact, be used with other types of networks and protocols, regardless of their nomenclature. Furthermore, though the techniques herein have been specifically related to update data, other types of data dissemination may benefit from the techniques herein, where a plurality of devices desire to receive the same "large" piece of information.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a computing device, a connectivity layout of a plurality of devices across an area;
   grouping, by the computing device, the plurality of devices into one or more update clusters based at least on the connectivity layout;
   dividing, by the computing device, update data into a plurality of update portions for a particular cluster of the one or more update clusters;
   distributing, from the computing device, the plurality of update portions to a plurality of selected redistribution devices in the particular cluster, each redistribution device receiving one or more of the plurality of update portions; and
   notifying, by the computing device, one or more of the plurality of devices in the particular cluster, for which the update data is applicable, of the plurality of selected redistribution devices along with which particular update portions are available from each of the plurality of selected redistribution devices, causing the one or more of the plurality of devices for which the update data is applicable to i) download needed update portions of the plurality of update portions from the redistribution devices, ii) combine all of the plurality of update portions into the update data, and iii) perform an update using the combined update data,
   wherein the dividing of the update data into the plurality of update portions for the particular cluster comprises determining how to divide the update data based on one more characteristics of the plurality of devices selected from a group consisting of: bandwidth; resource usage; available memory; and available storage space.

2. The method as in claim 1, further comprising:
   redundantly distributing the plurality of update portions, wherein each of the plurality of update portions is distributed to two or more selected redistribution devices in the particular cluster.

3. The method as in claim 1, wherein one or more of the selected redistribution devices in the particular cluster are not devices for which the update data is applicable.

4. The method as in claim 1, further comprising:
   registering the plurality of devices across the area, wherein registering comprises discovering one or more characteristics of the plurality of devices selected from a group consisting of: device capabilities; device software; device hardware; device firmware; location relative to other devices; connection to other devices; and physical location.

5. The method as in claim 1, further comprising:
   securely limiting which of the plurality of devices across the area can be selected as redistribution devices.

6. The method as in claim 1, wherein the plurality of update portions for a particular cluster comprises different-sized portions.

7. The method as in claim 1, wherein distributing the plurality of update portions to a plurality of selected redistribution devices in the particular cluster results in certain redistribution devices receiving a different number of update portions.

8. The method as in claim 1, further comprising:
   receiving, from a particular device of the plurality of devices in the particular cluster, acknowledgment of the particular device having downloaded a given update portion of the plurality of update portions; and, in response,
   notifying one or more of the plurality of devices in the particular cluster, for which the update data is applicable, that the particular device is a redistribution device for the given update portion.

9. A method, comprising:
   receiving, by a particular device among a plurality of devices in a particular update cluster, a notification of a plurality of selected redistribution devices for the particular update cluster along with a list of a plurality of update portions of update data that are available from each of the plurality of selected redistribution devices, wherein the plurality of devices are grouped into one or more update clusters, wherein the update data is divided into the plurality of update portions based on one more characteristics of the plurality of devices selected from a group consisting of: bandwidth; resource usage; available memory; and available storage space, and wherein the plurality of update portions are distributed to the plurality of selected redistribution devices, each redistribution device receiving one or more of the plurality of update portions;

downloading, by the particular device, needed update portions of the plurality of update portions from the corresponding selected redistribution devices;

combining, by the particular device, all of the plurality of update portions into the update data; and performing, by the particular device, an update of the particular device using the combined update data.

10. The method as in claim 9, wherein the plurality of update portions is redundantly distributed and each of the plurality of update portions is distributed to two or more selected redistribution devices in the particular update cluster, the method further comprising:

selecting a particular redistribution device for each needed update portion from which to download that needed update portion.

11. The method as in claim 9, wherein one or more of the selected redistribution devices in the particular cluster are not devices for which the update data is applicable.

12. The method as in claim 9, further comprising:

registering the particular device with a controller for the particular update cluster, wherein registering comprises sharing one or more characteristics of the particular device selected from a group consisting of: device capabilities; device software; device hardware; device firmware; location relative to other devices; connection to other devices; and physical location.

13. The method as in claim 9, wherein the particular device is a redistribution device, the method further comprising:

uploading one or more of the plurality of update portions to one or more other devices in the particular update cluster.

14. The method as in claim 9, wherein performing the update is in response to receiving a specific instruction from a controller for the particular update cluster after combining all of the plurality of update portions into the update data.

15. A method, comprising:

receiving, by a particular redistribution device of a plurality of selected redistribution devices in a particular update cluster, one or more particular update portions of a plurality of update portions of update data, wherein the update data is divided into the plurality of update portions based on one more characteristics of the plurality of devices selected from a group consisting of: bandwidth; resource usage; available memory; and available storage space;

wherein one or more of a plurality of devices in the particular update cluster, for which the update data is applicable, are notified of the plurality of selected redistribution devices along with which particular update portions are available from each of the plurality of selected redistribution devices; and uploading, from the particular redistribution device to one or more of the plurality of devices for which the update data is applicable, needed update portions of the one or more particular update portions at the particular redistribution device;

wherein the one or more of the plurality of devices for which the update data is applicable are configured to i) combine all of the plurality of update portions into the update data, and ii) perform an update using the combined update data.

16. The method as in claim 15, wherein the plurality of update portions is redundantly distributed and each of the plurality of update portions is distributed to two or more selected redistribution devices in the particular update cluster.

17. The method as in claim 15, wherein the particular redistribution device is not a device for which the update data is applicable.

18. The method as in claim 15, wherein the particular redistribution device meets one or more security requirements for being selected as a redistribution device for the particular update cluster.

\* \* \* \* \*